United States Patent
Bedwani et al.

(10) Patent No.: US 7,724,645 B2
(45) Date of Patent: May 25, 2010

(54) METHOD AND APPARATUS FOR SERIAL LINK DOWN DETECTION

(75) Inventors: Serge R. Bedwani, Folsom, CA (US);
Soon Seng Seh, Pulau Pinang (MY);
Siang Lin Tan, Penang (MY); Amber Huffman, Banks, OR (US); Chai Huat Gan, Penang (MY)

(73) Assignee: Intel Corporation, Santa Clara, CA (US)

( * ) Notice: Subject to any disclaimer, the term of this patent is extended or adjusted under 35 U.S.C. 154(b) by 1002 days.

(21) Appl. No.: 11/476,252

(22) Filed: Jun. 27, 2006

(65) Prior Publication Data
US 2008/0005621 A1    Jan. 3, 2008

(51) Int. Cl.
*H04J 1/16*    (2006.01)
(52) U.S. Cl. ........................ 370/216; 370/360
(58) Field of Classification Search .............. 370/360, 370/216, 242, 243, 244, 246, 247, 252
See application file for complete search history.

(56) References Cited

U.S. PATENT DOCUMENTS

| | | | |
|---|---|---|---|
| 7,191,255 B2 * | 3/2007 | Wong et al. | 710/5 |
| 7,450,519 B2 * | 11/2008 | Yamauchi | 370/243 |
| 2006/0034181 A1 * | 2/2006 | Noguchi et al. | 370/242 |
| 2007/0195770 A1 * | 8/2007 | Kimura et al. | 370/390 |

\* cited by examiner

*Primary Examiner*—Brenda Pham
(74) *Attorney, Agent, or Firm*—Blakely, Sokoloff, Taylor & Zafman LLP

(57) ABSTRACT

An apparatus and method for serial link down detection are described. In one embodiment, the method includes the detection of an initial link down condition of a serial link. In one embodiment, the initial link down condition is detected, for example, when a transition from a normal signaling voltage level to a squelch signaling voltage level is detected at a receiver input. When an initial link down condition is detected, the issuance of a link down signal is delayed for a predetermined period of time from the detection of the squelch voltage over the serial link. In one embodiment, the link down signal is asserted if a data error is detected following the predetermined period of time from the detection of the squelch voltage. Other embodiments are described and claimed.

18 Claims, 4 Drawing Sheets

METHOD AND APPARATUS FOR SERIAL LINK DOWN DETECTION

FIELD

One or more embodiments relate generally to the field of high speed serial interface integrated circuits and computer system design. More particularly, one or more of the embodiments relate to a method and apparatus for serial link down detection.

BACKGROUND

For various serial interfaces, such as Serial ATA (SATA), Serial Attached small computer system interface (SCSI) (SAS), PCIe, Fibre-Channel, ten gigabit attachment unit interface (XAUI), where 8b10b encoding is used for signaling, it is necessary to decipher whether the interface is in a valid signal-level state. Squelch Detector circuits are often used in conjunction with the High-Speed receiver circuits to detect these various signaling levels and states.

At the physical layer level, signaling can be classified as "In-Band", "Out-of-Band", and "Link-Down" (Disconnected or powered down). In-Band signaling is used for normal data transfer operations, and Out-of-Band signaling is used for various Reset, Wake-up, and other asynchronous operations that do not need the high-speed receiver and Clock/Data Recovery Circuits to be "locked-on" to the incoming serial data stream.

As the squelch detector circuit is intended to detect signaling levels, rather than to decipher the incoming serial bit-stream, it can achieve its design objectives with a lower bandwidth performance than the high-speed receiver. In optimizing these circuits for low-power operations, it is an acceptable performance/power compromise to have process, voltage, temperature (PVT) variations for the detector circuit threshold within a prescribed range.

As this detector circuit threshold will vary, additional circuitry and respective detection algorithms are highly desirable to ensure robust detection of the signaling levels, and link states.

The definition of an 8b/10b transmission code is identical to that specified in ANSI X3.230-1994, Clause 11 (and also IEEE 802.3Z, 36.2.4, July 1998). Using this scheme, 8 bit characters and one control bit are treated as 3 bits and 5 bits, mapped onto a 4 bit group code and a 6 bit group code, respectively. The control bit, in conjunction with the data characters is used to identify when to encode one of the 12 special symbols included in the 8b/10b transmission. As such, these code groups are concatenated to form a 10 bit symbol, which is transmitted from a transmitter to a corresponding receiver via a dual differential link.

The 8b/10b code also provides a scheme which is DC balanced, indicating that the generated code stream, or bit stream, includes a balanced number of 1 and 0 bits. In addition, the code ensures a limited run length, such that no more than five consecutive ones, "1", or zeros, "0", and a guaranteed transition density which permits clock recovery from the data stream. Accordingly, the combination of these features allows the receiving end of an encoded 8b/10b data stream to extract the bit rate clock to determine symbol (and packet) boundaries and to detect most transmission errors. Likewise, 8b/10b codes include the concept of disparity, wherein the disparity of any block of data is defined as the difference between the number of ones and the number of zeros. As such, positive and negative refer to an excess of ones over zeros or zeros over ones, respectively. Consequently, the code scheme guarantees that an encoded symbol's disparity is always either zero (11111, 00000), plus two (111111, 0000) or −2 (1111, 000000), which is quite useful for error detection.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for serial link down detection are described. In one embodiment, the method includes the detection of an initial link down condition of a serial link. In one embodiment, the initial link down condition is detected, for example, when a transition from a normal voltage level to a squelch voltage level is detected at a receiver input. When an initial link down condition is detected, the issuance of a link down signal is delayed for a predetermined period of time from the detection of the squelch voltage over the serial link.

In one embodiment, the link down signal is asserted if a data error is detected following the predetermined period of time from the detection of the squelch voltage. Accordingly, by delaying the issuance of a link down signal following the detection of a common mode voltage over a serial link until a data error is detected following the detection of the common mode voltage, detection of false link down conditions may be avoided.

For various serial interfaces, such as Serial ATA (SATA), Serial Attached SCSI (SAS), PCIe, Fibre-Channel, XAUI, where 8b10b encoding is used for signaling, it is necessary to decipher whether the interface is in valid signal-levelings state. In addition, disconnect events, as well as intentional "squelch" signaling states are detected as distinct from valid signaling conditions. Minimum valid signaling levels may be defined for each of these interfaces and the use of a squelch detection circuit may be required to distinguish valid signaling levels from squelch signaling levels.

Furthermore, to optimize performance, it is desirable to be able to receive low-signaling levels, that are very close to, or overlap slightly below the squelch detector circuit threshold. Furthermore, as there can be some process-voltage-temperature variation in the detector circuit threshold, especially if this circuit is optimized for low-power operation, there needs to be additional circuitry or detection algorithm to ensure robust detection of the link states.

Figure 1:
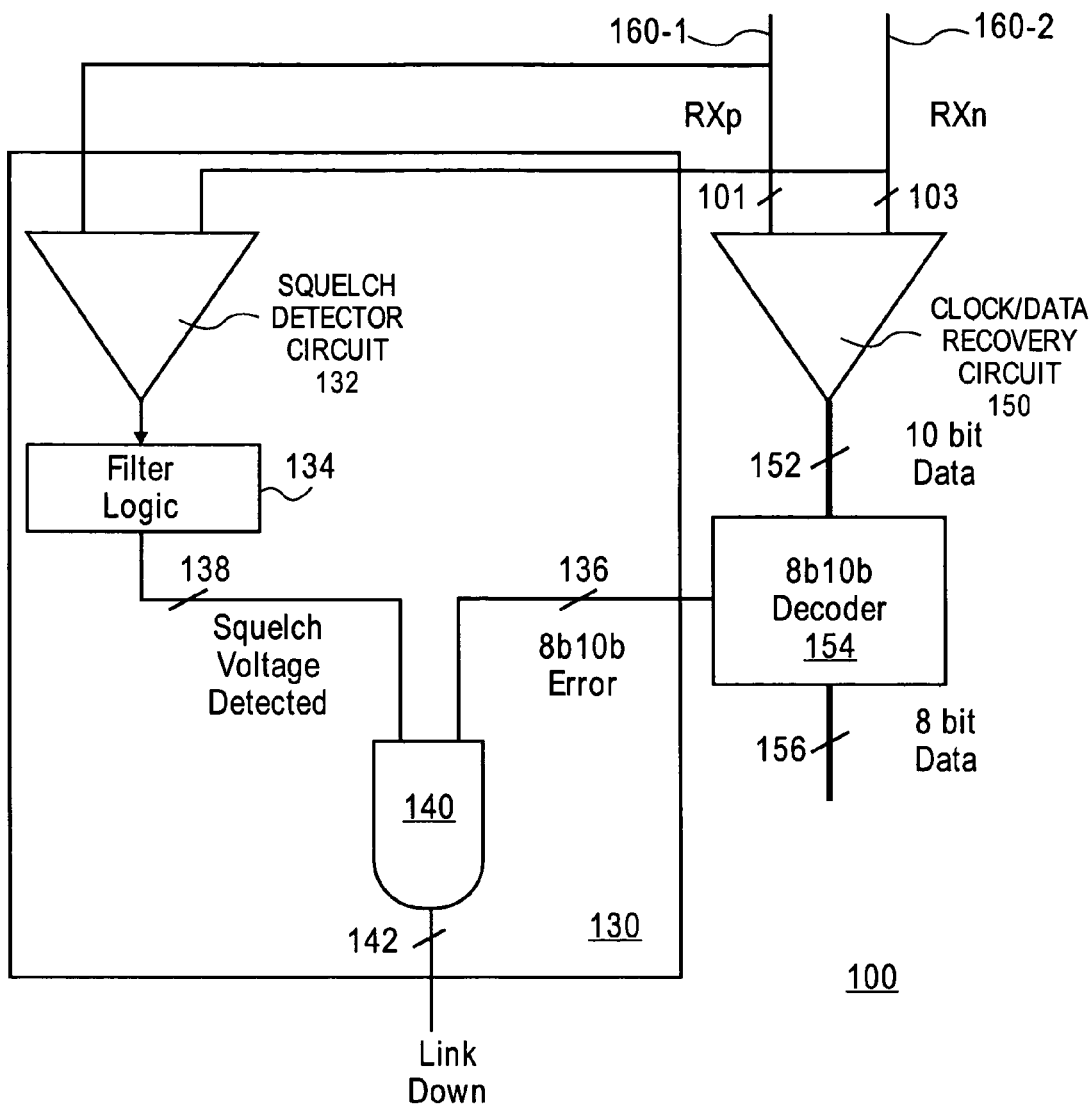
FIG. 1 is a block diagram illustrating a serial interface controller including link state logic to provide serial link down detection, in accordance with one embodiment.

FIG. 1 is a block diagram illustrating link controller 100 and link state logic 130 to provide serial link down detection, according to one embodiment. FIG. 1 illustrates link state logic 130 that uses squelch detector circuits 132 in combination with a programmable digital filter 134, as well as 8b10b error detection 154 to provide a robust and versatile solution to avoid detection of false link down conditions that might interfere with out-of-band (OOB) signaling schemes, according to one embodiment. As described herein, OOB signaling schemes may include, but are not limited to, the use of squelch signaling states to perform OOB signaling operations, including, but not limited to, wake-up, and reset handshaking operations, or other like OOB signaling operations.

Figure 2:
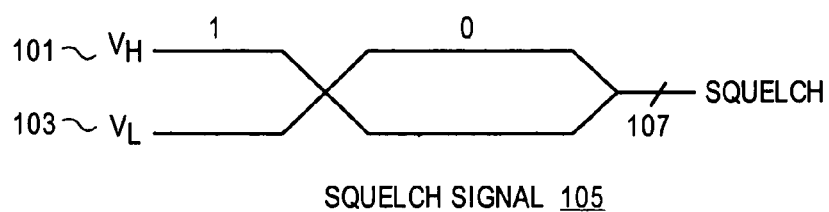
FIG. 2 is a timing diagram illustrating a squelch signal to provide initial link down detection, according to one embodiment.

In one embodiment, serial link 160, includes a signaling state wherein a differential voltage of differential signal pair RXp 101 and RXn 103 are driven to a squelch signaling voltage level, as shown in FIG. 2. As illustrated in FIG. 2, timing diagram 105 illustrates a squelch signal 107, according to one embodiment. Representatively, the detection of an initial link down detection may consist of input differential signal pairs RXp 101 and RXn 103 being driven to a squelch voltage (squelch signaling voltage level) 107, according to one embodiment.

Referring again to FIG. 1, in one embodiment, detection of the transition of the differential voltage from a normal signaling voltage level to a squelch signaling voltage level is equivalent to an initial link down condition. In one embodiment, squelch voltage detection logic 132 provides an initial link down signal to filter logic 134. In one embodiment, filtering logic 134 may delay the initial link down signal for a predetermined period of time from the detection of the transition to the squelch signaling voltage level over the serial link. Accordingly, following such predetermined period, filter logic 134 may assert a squelch voltage detection signal 138 to control logic 140.

As further shown in FIG. 1, in one embodiment, link state logic 130 may include squelch voltage detection logic 132, which may be coupled to differential receiver lines of serial link 160 (160-1, 160-2) to receive differential signal pair RXp 101 and RXn 103. In one embodiment, squelch voltage detection logic 132 may identify a squelch signaling voltage level of one or more squelch signaling voltage levels over a serial link 160. In one embodiment, differential signal pair (RXp 101 and RXn 103) is received over a serial link 160. As described herein, detection of a squelch signaling voltage level occurs when a differential voltage level of the differential signal pair (RXp 101 and RXn 103) transition from a normal signal voltage level to a squelch signal voltage level at a receiver input of serial link 160, for example, as shown in FIG. 2.

In one embodiment, serial interface controller 100 further includes a Data/Clock Recovery Circuit 150 to receive differential signal pairs 101 and 103. Representatively, 10 bit data 152 is output from Data/Clock Recovery Circuit 150, and provided to 8b10b decoder 154, which decodes such information to provide 8 bit data output 156. As further illustrated in FIG. 1, 8b10b decoder generates an 8b10b error signal 136, after the predetermined period of time from detection of the transition to the squelch signaling voltage level. For serial interface protocols, such as SAS, PCI-E, Fibre Channel, XAUI, SATA and other like serial interconnect protocols, an 8b/10b encoding scheme is used to encode 8 bit data bytes.

As indicated above, 8b10b coding encodes an 8 bit data byte into a DC balanced 10 bit symbol. In the embodiments described, an 8b10b error may be detected when an invalid 10 bit symbol is detected or a running disparity event is detected. However, it should be recognized that other forms of 8b10b errors may be used. Accordingly, as described herein, a data error may refer to an 8b10b error or other like encoding scheme error and remain within the scope of the described embodiments.

Referring again to FIG. 1, in response to 8b10b error signal 136 and squelch voltage detected signal 138, control logic 140 generates link down signal 142. Accordingly, as shown in FIG. 1, common mode voltage detection circuit 132 provides information of the wire state when a link is down or unplugged. In one embodiment, when the link is up after initial speed negotiation between a host and endpoint device, a common mode voltage detection provides an initial indication that the link may be down. However, issuance of a link down signal is delayed based on an initial qualifier of a data error, such as, for example, an 8b/10b error.

As shown in FIG. 1, if one or more 8b/10b errors are detected after a given period while the common mode voltage levels are detected, link down signal 142 is asserted. As described herein, the terms "assert" or "deassert," "set," or "reset" or other like terms may refer to actively low signaling where a signal is recognized as asserted when it is driven low and deasserted when it was driven high. However, other like signaling may be supported while remaining within the scope of the described embodiments. Procedural methods for implementing one or more of the above-described embodiments are now provided.

Figure 3:
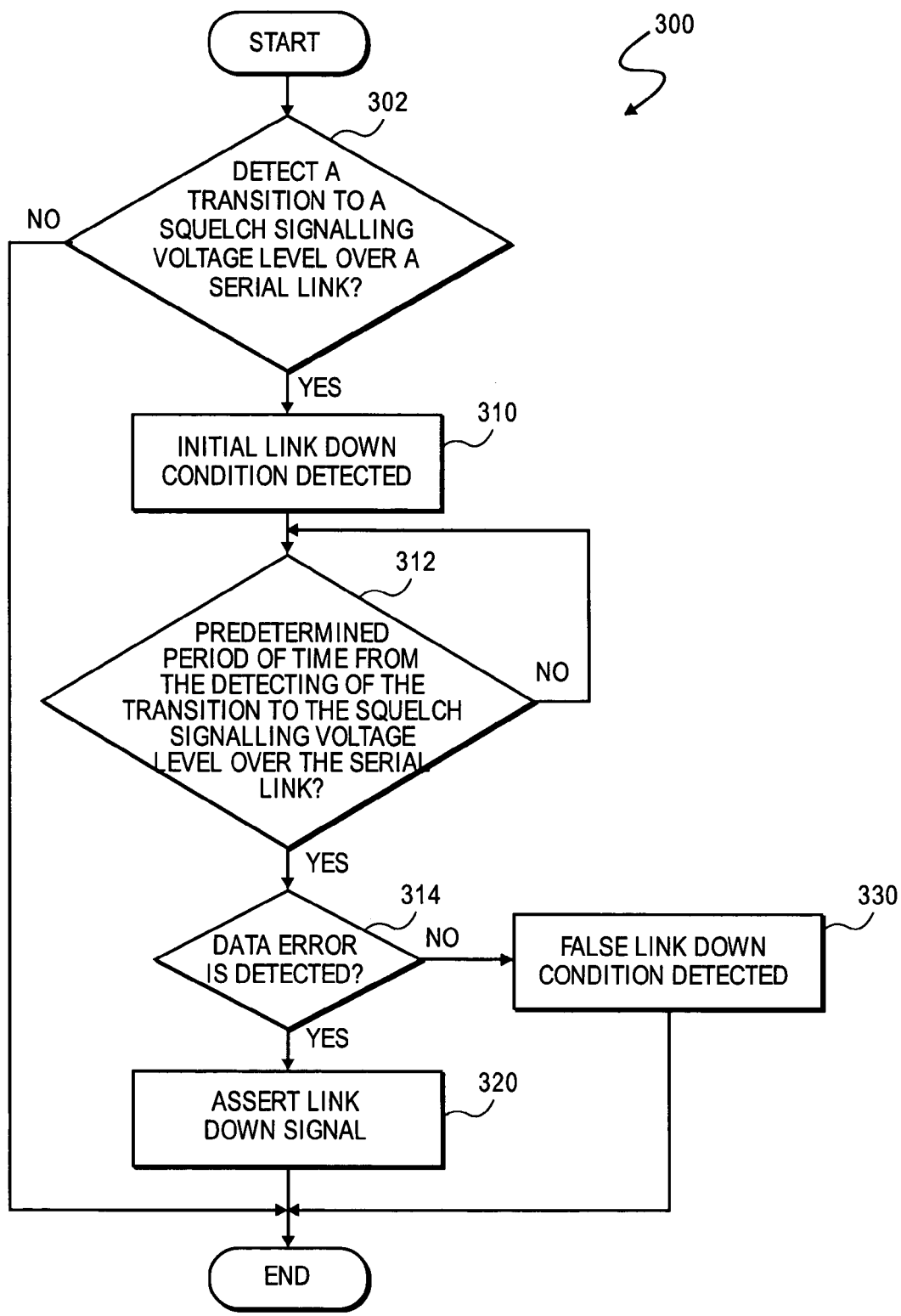
FIG. 3 is a block diagram illustrating a computer system to provide serial link down detection, in accordance with one embodiment.

Turning now to FIG. 3, the particular methods associated with various embodiments are described in terms of computer software and hardware with reference to a flowchart. The methods to be performed by a computing device (e.g., an endpoint/link controller) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments are not described with reference to any particular programming language. It will be appreciated that a variety of programming languages may be used to implement embodiments as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 3 is a flowchart illustrating a method 300 for serial link down detection, in accordance with one embodiment. In the embodiments described, examples of the described embodiments will be made with reference to FIGS. 1 and 2. However, the described embodiments should not be limited to the examples provided to limit the scope provided by the appended claims.

Referring again to FIG. 3, at process block 302, it is determined whether a common mode voltage is detected over a serial link. In one embodiment, a transition to a squelch signaling voltage level is detected over a serial link when a transition from a normal (differential) signaling voltage level to a squelch signaling voltage level is detected at a receiver input. As shown in FIG. 3, such detection results in the assertion of an initial link down condition, as shown at process block 310.

In one embodiment, to ensure that a true link down condition is detected, at process block 312, it is determined whether a predetermined period of time is expired from the initial detection of the common mode voltage. When such predetermined period of time is passed, at process block 314, it is determined whether a data error is detected. In one embodiment, a data error is detected if, for example, an 8b10b error is signaled by, for example, an 8b10b decoder. When such error is detected, a link down signal is asserted at process block 320 to illustrate that a true link down condition is detected. Otherwise, at process block 330, a false link down condition is detected.

Accordingly, in one embodiment, by supporting the detection of a true link down condition, interference with, for example, out-of-band (OOB) signaling schemes are avoided that may use, for example, squelch signaling states to perform OOB signaling operations. Accordingly, in contrast to existing designs, which are only based on a common mode voltage detection to determine whether a link has gone down, one embodiment of, for example, link state logic 1230, avoids false detection of link down conditions.

As known to those skilled in the art, a false link down condition results in failed commands, and in some cases, a blue screen or loss of the system drive. Recovery from such link down conditions may require, for example, issuance of a reset, which may not be supported by legacy software. Accordingly, avoidance of link down conditions is imperative when using legacy software.

In one embodiment, a link down condition is indicated when the common mode voltage is detected on the wire and one or more 8b10b errors are detected following a predetermined period of time from detection of the common mode voltage. However, if an 8b10b error is not detected while the common mode voltage is detected, squelch signaling may be detected where OOB signaling schemes are going on while the receivers and transceivers operate according to a common mode voltage.

Figure 4:
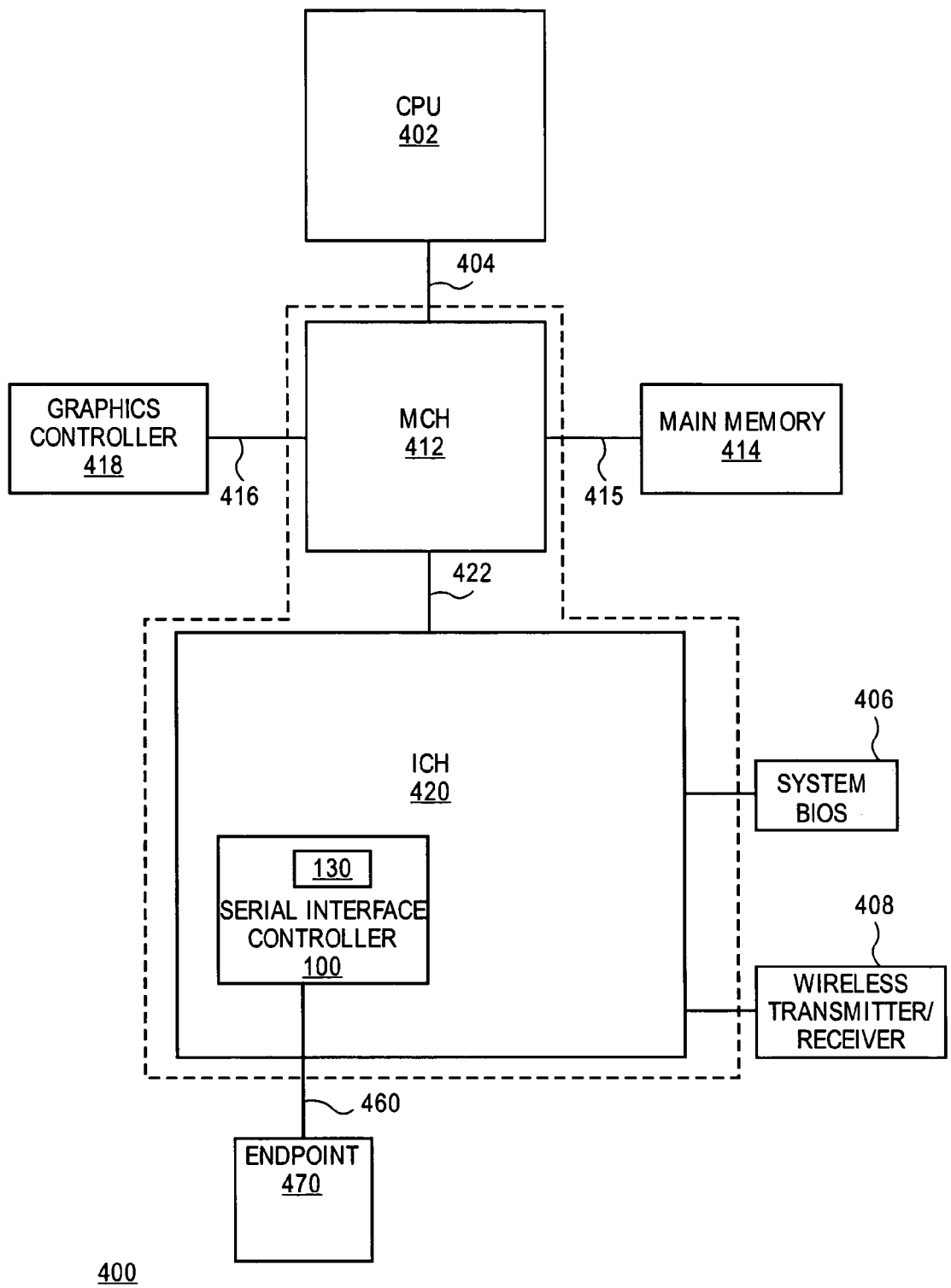
FIG. 4 is a flowchart illustrating a method for serial link down detection, in accordance with one embodiment.

FIG. 4 is a block diagram illustrating computer system 400 including serial interface controller 100 having link state logic 130, as shown in FIG. 1, to provide serial link down detection, in accordance with one embodiment. Representatively, computer system 400 comprises a processor system bus (front side bus (FSB)) 404 for communicating information between processor (CPU) 402 and chipset 410. As described herein, the term "chipset" is used in a manner to collectively describe the various devices coupled to CPU 402 to perform desired system functionality. In one embodiment, CPU 402 may be a multicore chip multiprocessor (CMP).

Representatively, chipset 410 may include memory controller hub 412 (MCH) coupled to graphics controller 418 via interconnect 416. In an alternative embodiment, graphics controller 418 is integrated into MCH 412, such that, in one embodiment, MCH 412 operates as an integrated graphics MCH (GMCH). Representatively, MCH 412 is also coupled to main memory 414 via interconnect 415. In one embodiment, main memory 414 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

As further illustrated, in one embodiment, chipset 410 includes an input/output (I/O) controller hub (ICH) 420 coupled to MCH 412 via link 422. Representatively, ICH 420 may couple a universal serial bus (USB) link or interconnect to couple one or more USB slots (not shown) to ICH 420. Likewise, a serial advance technology attachment (SATA) may couple hard disk drive devices (HDD) (not shown) to ICH 420. In one embodiment, basic input/output system (BIOS) 406, which may be stored within a flash memory or other like non-volatile memory, initializes computer system 400. Input/output controller 420 is also coupled to wireless transmitter and receiver circuitry 408.

Although chipset 410 is illustrated as including a separate MCH 412 and ICH 420, in one embodiment, MCH 412 may be integrated within CPU 402. In an alternate embodiment, the functionality of MCH 412 and ICH 420 are integrated within chipset 410. In one embodiment, link state logic 130 may be implemented within computer systems including an MCH integrated within a CPU, an MCH and ICH integrated within a chipset, as well as a system on-chip. Accordingly, those skilled in the art recognize that FIG. 4 is provided to illustrate one embodiment and should not be construed in a limiting manner.

In one embodiment, ICH 420 includes serial interface controller 100, as shown in FIG. 1, for controlling serial link 460 to couple endpoint device 470 to chipset 410. Representatively, in one embodiment, serial link 460 may support a serial link protocol including, but not limited to, common system Interface (CSI), peripheral component interconnect (PCI) Express (PCI-E), SATA, SAS, Fibre-Channel, XAUI or other like serial interconnect. Accordingly, although one or more of the embodiments described herein may be provided with reference to SATA, those skilled in the art should recognize that the embodiments described herein are not limited to serial links, which support SATA, and are therefore applicable to other serial link protocols.

Figure 5:
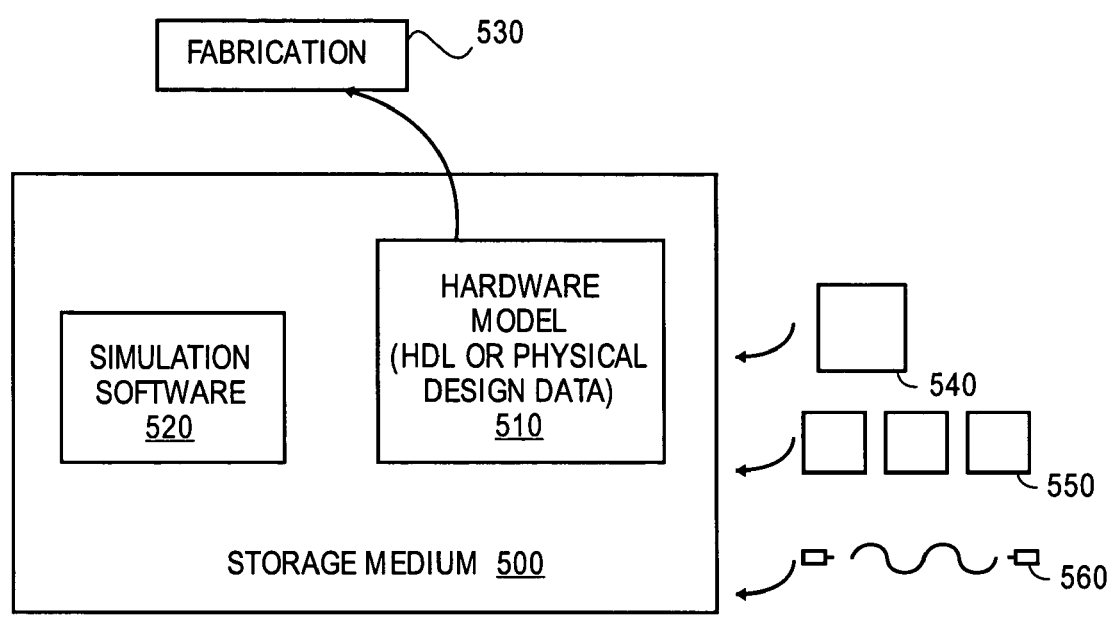
FIG. 5 is a block diagram illustrating various design representations for formats for simulation, emulation and fabrication of a design using the disclosed techniques.

FIG. 5 is a block diagram illustrating various representations or formats for simulation, emulation and fabrication 530 of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 510 may be stored in a storage medium 500, such as a computer memory, so that the model may be simulated using simulation software 520 that applies a particular test suite 530 to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable medium. An optical or electrical wave 560 modulated or otherwise generated to transport such information, a memory 550 or a magnetic or optical storage 540, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternate Embodiments

It will be appreciated that, for other embodiments, a different system configuration may be used. For example, while the system 400 includes a single CPU 402, for other embodiments, a multiprocessor system or more or more multicore (where one or more processors cores may be similar in configuration and operation to the CPU 402 described above) may benefit from the serial link down detection of various embodiments. Further different type of system or different type of computer system such as, for example, a server, a workstation, a desktop computer system, a gaming system, an embedded computer system, a blade server, etc., may be used for other embodiments.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. An apparatus, comprising:
   a controller including an interface, the interface including link state logic to detect an initial link down condition of a serial data link and to assert a link down signal to an endpoint device coupled to the link if a data error is detected following a predetermined period of time from the detection of the initial link down condition.

2. The apparatus of claim 1, wherein the link state logic further comprises:
   squelch detector logic to detect a transition from a normal voltage signaling level to a squelch voltage signaling level as an initial link down condition; and
   control logic to receive an initial link down signal and a data error signal, the control logic to assert the link down signal according to the initial link down signal and the data error signal.

3. The apparatus of claim 2, wherein the link state logic further comprises:
   filter logic to receive the initial link down signal and delay issuance of the link down signal to the control logic until the predetermined period of time from the detection of the initial link down condition.

4. The apparatus of claim 1, wherein the apparatus comprises an input/output controller hub.

5. The apparatus of claim 1, wherein the controller comprises a serial interface controller.

6. A system comprising:
   a processor;
   a memory;
   a chipset coupled to the processor, the chipset comprising:
      an input/output (I/O) controller hub, including a serial interface controller having link state logic to detect a transition to a squelch signaling voltage level over a serial link and to assert a link down signal to an endpoint device coupled to the link if a data error is detected following a predetermined period of time from the detection of the transition to the squelch signaling voltage level over the serial link; and
   a wireless transmitter and receiver circuitry coupled to the chipset.

7. The system of claim 6, wherein the link state logic further comprises:
   squelch detector logic to detect a transition from a normal signaling voltage levels to squelch voltage signaling levels as an initial link down condition; and
   control logic to receive an initial link down signal and a data error signal, the control logic to assert the link down signal according to the initial link down signal and the data error signal, following the predetermined period of time from detection of the transition to the squelch signaling voltage level over the serial link.

8. The system of claim 7, wherein the link state logic further comprises:
   filter logic to receive the initial link down signal and delay issuance of the link down signal to the control logic until the predetermined period of time from the detection of the initial link down condition.

9. The system of claim 7, wherein the chipset further comprises:

a memory controller coupled to both the processor and the I/O controller hub, wherein the serial link comprises a serial advance technology attachment (SATA) link.

10. The system of claim 6, wherein the interface further comprises:

Data/Clock Recovery Circuit logic to produce a parallel output; and an 8b/10b decoder to receive the parallel output and to assert the data error signal if one of an invalid bit symbol and a running disparity event is detected.

11. A method comprising:

detecting a transition of a differential voltage of a differential signal pair received over a serial link from a normal differential signaling voltage level to a squelch signaling voltage level;

asserting a link down signal if a data error is detected following a predetermined period of time from the detecting of the transition of the differential voltage from the normal differential signaling voltage level to the squelch signaling voltage level over the serial link;

detecting, at a receiver input, the transition from the normal differential signaling voltage level to a squelch signaling voltage level as an initial link down condition; and delaying issuance of a link down event until a data error is detected.

12. The method of claim 11, further comprising:

detecting a squelch signaling state if the data error is not detected following the predetermined period of time from the detecting of the transition to the squelch signaling voltage levels over the serial link.

13. The method of claim 11, wherein asserting the link down signal further comprises:

detecting one of an invalid bit symbol and a running disparity event as the data error;

issuing a link down event to cause assertion of the link down signal.

14. The method of claim 11, further comprising:

detecting a false link down condition if the data error is not detected following the predetermined period of time from the detecting of the transition to the squelch signaling voltage level over the serial link.

15. An article of manufacture comprising a computer-readable storage medium stores therein computer executable instructions, when executed, results in a computer performing:

detecting an initial link down condition of a serial link;

delaying issuance of a link down signal until a data error is detected over the serial link;

detecting, at a receiver input, a transition from a normal signaling voltage level to squelch signaling voltage level as an initial link down condition; and delaying issuance of a link down event until a data error is detected.

16. The article of manufacture of claim 15, wherein the machine accessible medium further comprises data, which when accessed by the machine, further results in the machine further performing:

detecting a squelch signaling state if the data error is not detected following a predetermined period of time from the detecting of the initial link down condition.

17. The article of manufacture of claim 15, wherein the machine accessible medium further comprises data, which when accessed by the machine, further results in the machine further performing:

detecting one of an invalid bit symbol and a running disparity event as the data error.

18. The article of manufacture of claim 15, wherein the operation of detecting the initial link down condition, further results in the machine performing:

detecting a squelch signaling voltage level over a serial link as the initial link down condition.

* * * * *